(12) United States Patent
Lott et al.

(10) Patent No.: US 7,755,248 B2
(45) Date of Patent: Jul. 13, 2010

(54) INTEGRATED DRIVE ELEMENT

(75) Inventors: Thomas Lott, Buehl (DE); Joerg Moessner, Reutlingen (DE); Christian Breuning, Nuertingen (DE); Wolfgang Jacob, Horb (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/159,300

(22) PCT Filed: Jun. 22, 2007

(86) PCT No.: PCT/EP2007/056236

§ 371 (c)(1),
(2), (4) Date: Jun. 26, 2008

(87) PCT Pub. No.: WO2008/012149

PCT Pub. Date: Jan. 31, 2008

(65) Prior Publication Data

US 2008/0318724 A1   Dec. 25, 2008

(30) Foreign Application Priority Data

Jul. 28, 2006   (DE) .................. 10 2006 035 062

(51) Int. Cl.
*H02K 11/00* (2006.01)
*H02K 39/38* (2006.01)
(52) U.S. Cl. ..................... 310/239; 310/233
(58) Field of Classification Search ......... 310/112–114, 310/239, 71, 233, 89
See application file for complete search history.

(56) References Cited

U.S. PATENT DOCUMENTS

| 1,874,094 | A | * | 8/1932 | Ford et al. .................. 318/625 |
| 4,122,377 | A | * | 10/1978 | Drummond .................. 318/45 |
| 4,900,967 | A | * | 2/1990 | Amano et al. ............... 310/239 |
| 5,534,737 | A | * | 7/1996 | Nishimura .................. 310/112 |
| 6,047,799 | A | | 4/2000 | Ahnert et al. |
| 6,484,598 | B2 | | 11/2002 | Peter |
| 2002/0062714 | A1 | | 5/2002 | Albert et al. |
| 2003/0193261 | A1 | * | 10/2003 | Ambrose et al. ............ 310/233 |
| 2006/0208586 | A1 | * | 9/2006 | Guttenberger ............... 310/71 |

FOREIGN PATENT DOCUMENTS

| DE | 197 49 681 | | 5/1998 |
| EP | 1 172 587 | | 1/2002 |
| EP | 1 302 704 | | 4/2003 |
| EP | 1 323 956 | | 7/2003 |
| JP | 08009602 | * | 1/1996 |

* cited by examiner

*Primary Examiner*—Quyen Leung
*Assistant Examiner*—Leda Pham
(74) *Attorney, Agent, or Firm*—Michael J. Striker

(57) ABSTRACT

Proposed is an integrated drive element (110) which is particularly suitable for use in an automatic shift transmission of a motor vehicle. The integrated drive element (110) has at least one electric motor (112), with preferably precisely two electric motors (112) being provided which can be used for example for a dual-clutch transmission. Also provided is at least one electronic engine control unit (114) which is designed for controlling the functionality of the at least one electric motor (112). Said electronic engine control unit (114) in turn has a housing (116). The at least one electric motor (112) spatially directly adjoins the housing (116) and/or is at least partially integrated into the at least one housing (116).

7 Claims, 5 Drawing Sheets

INTEGRATED DRIVE ELEMENT

The present invention relates to an integrated drive element with at least one electric motor and at least one electronic engine control unit. Integrated drive elements of this type are used in the field of automotive engineering in particular, e.g., in the field of automatic transmissions.

RELATED ART

Drive elements and/or actuating elements in the form of electric motors are used in various fields in automotive engineering. A typical application is drive elements that are used in transmission engineering.

For example, various types of automatic transmissions have been developed, the various shift settings of which are typically selected via direct-current motors. One example is the double clutch transmission, with which each of two intermeshing transmission shafts is combined with a clutch. Double clutch transmissions of this type represent a refinement of sequential transmissions, which permit driving without engaging the clutch and shifting, and which have proven to result in fuel-efficient, low-emission operation of the motor vehicle.

With double clutch transmissions, shifting (manual or automatic) takes place particularly quickly, since a shift procedure may be carried out in a first clutch group, while the torque is transmitted via a gear to another group. Shift delay is therefore practically eliminated altogether.

With a single sequential transmission, actuation is performed by a single electric motor. With a double clutch transmission, actuation is performed by two individual electric motors, which, in many applications, have replaced the otherwise common central hydraulic system.

In this case, one or more engine control units control the functionalities of the electric motor(s). The engine control unit typically processes parameters such as driving speed, gas pedal and selector lever position, parameters for gear selection and/or engine speed. These parameters may be obtained, e.g., by the central engine control unit (ECU) of the motor vehicle, e.g., via a CAN bus.

The engine control units for the electric motors of the transmission are typically installed separately from the electric motors, each of them being installed individually on a transmission housing of the motor vehicle. The engine control unit and electric motor are typically connected using plugs and cable connections (a wiring harness).

This typical technique has the disadvantage, however, that expensive manufacturing processes are required, since the cables and wiring harness typically must be installed manually. This step is therefore one of the most costly and time-intensive manufacturing steps.

The large number of assemblies is a further disadvantage. Every assembly, e.g., the engine control unit, plug, electric motors and cables, is typically encapsulated individually and therefore requires a great deal of installation space near the transmission. In addition, the process of connecting the individual components is a frequent source of error.

ADVANTAGES OF THE INVENTION

An integrated drive element is therefore provided that largely avoids the disadvantages of the related art.

A key idea behind the present invention is that at least one electric motor (and preferably exactly two electric motors, for use in a double clutch transmission) is integrated entirely or partially with at least one electronic engine control unit that controls the functionality of the at least one electric motor according to the aforementioned description of the related art. To this end, the at least one engine control unit includes a housing (which may be composed of one or multiple components). The at least one electric motor is located directly next to the housing, and/or it is integrated, at least partially, in the at least one housing.

The present invention makes it possible to eliminate the wiring harness—either entirely or partially—that is described above and that is common in the related art.

According to one possible embodiment of the present invention, the at least one brush carrier of the at least one electric motor, which is equipped with at least one brush, is already integrated in the housing of the at least one engine control unit. For example, the at least one brush may be spring-loaded, and it may be pressed via at least one spring element against at least one commutator of the at least one electric motor, thereby ensuring that it is electrically contacted during operation.

In this manner, the time-consuming step of installing the brush carrier in the electric motor, which is usually a separate component in typical electric motors, may be eliminated. The housing of the at least one engine control unit with the at least one brush carrier may then be designed such that the at least one electric motor need only be plugged in, at which point it is electrically contacted immediately via the at least one brush. Only one mechanical attachment is then required, e.g., using appropriate fastening elements.

To simplify plugging the at least one electric motor into the housing of the at least one engine control unit, a sleeve with at least one guide surface may be installed, e.g., on an armature shaft of the at least one electric motor. This at least one guide surface preferably includes at least one conical surface, although guide surfaces with other forms (e.g., curved guide surfaces or multi-stepped guide surfaces) may be used. This at least one guide surface is preferably designed such that, when the at least one electric motor is installed on or plugged into the at least one housing, the at least one spring-loaded brush is moved toward the at least one commutator. Typically, the at least one brush is pressed back against the force of the at least one spring element until the at least one brush comes in contact with the at least one commutator. The at least one sleeve may be designed, e.g, as a divided sleeve that may be clipped onto the at least one armature shaft. To this end, the at least one armature shaft may also include, e.g., one or more grooves for receiving the sleeve. The sleeve may be designed as one piece or as a multiple-component part. Advantageously, this at least one sleeve may also include at least one sensor magnet for measuring the rotational position of the at least one electric motor.

In a further possible embodiment of the integrated drive element, the housing of the at least one engine control unit already accommodates at least one bearing of the at least one electric motor. For example, the integrated drive element may be designed such that at least one axle and/or shaft of the at least one electric motor—in particular at least one armature shaft—passes through the housing entirely or partially. It is then possible for at least one bearing, e.g., a ball bearing, to be integrated in the housing. In this manner, a separate bearing flange of the at least one electric motor may be advantageously eliminated, thereby eliminating an installation step and/or reducing weight.

The housing may also include fastening elements for attaching the integrated drive element to a transmission housing of a motor vehicle. For example, the housing may include screw-attachment points for this purpose. In all, this measure—as well as the integration of the at least one bearing in the housing—results in a considerable reduction in the total screw-attachment surface area on the transmission.

DRAWING

The present invention is explained in greater detail with reference to the drawing below.

FIG. 1 shows an exemplary embodiment of an integrated drive element 110 that, as described above, is particularly suited for use to actuate double clutch transmissions (i.e., for use as a double clutch-actuating element).

Integrated drive element 110 includes two electric motors 112. For example, one of the two electric motors 112 may be used in a double clutch transmission as a selecting motor, and the other of the two electric motors 112 may be used as a shifting motor. Other possible applications of the assembly shown in FIG. 1 are also feasible.

Figure 1:
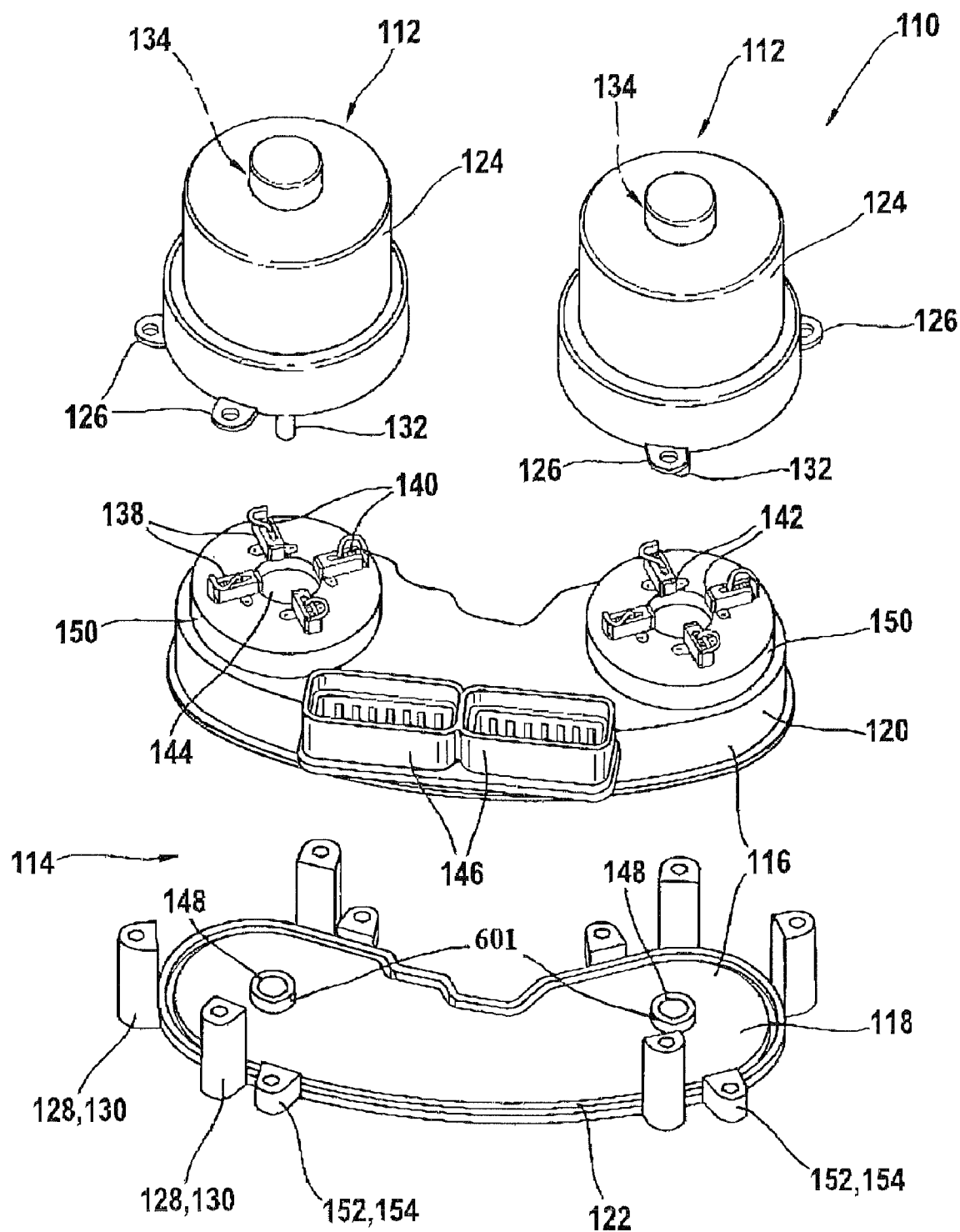
FIG. 1 shows an exemplary embodiment of an integrated drive element with two electric motors, in an exploded view, at an angle from above.

In addition to electric motors 112, integrated drive element 110 includes—in the depiction shown in FIG. 1—an engine control unit 114 with a housing 116. In this example, housing 116 has a two-pieced design and is composed of a base plate 118 and a cover 120, it being possible to attach cover 120 to base plate 118 via a circumferential groove 122.

An electronics printed circuit board of engine control unit 114 is installed in housing 116 that includes the essential electronic components of engine control unit 114, which are not shown, however, in the simplified exploded view in FIG. 1 (see reference numeral 412 in FIG. 4, below).

Each of the electric motors 112 includes a pole pot 124. Pole pots 124 are designed, e.g., as deep-drawn steel components. As known to one skilled in the technical art, and as is common with direct-current motors, appropriately shaped stator magnets are bonded to or attached in another manner to the inner wall of pole pots 124. These stator magnets are not shown in the illustrations shown in FIGS. 1 through 4. It should be pointed out that another design of pole pots 124 is also possible, e.g., as injection-molded components with magnets incorporated via injection molding, or with magnetic plastics. Further designs are known to one skilled in the technical art.

Pole pots 124 are equipped with screw-attachment eyelets 126, e.g., tabs that are formed as a single piece with pole pots 124. Via screw-attachment eyelets 126, pole pots 124 may be screwed together with corresponding threaded bores in base plate 118 of housing 116. Threaded bores 128 are initial attachment elements 130.

An armature shaft 132, which is supported on pole pots 124 in a bearing 134, is installed in each of the pole pots 124 of electric motors 112. Rotor laminated cores are installed on armature shafts 132. The rotor laminated cores are not shown in FIG. 1, but their design is known to one skilled in the technical art from the field of direct-current motors. Rotor coil windings—which are not shown, either—are installed on these rotor laminated cores. These rotor coil windings are connected with a commutator ring 136, which is shown, e.g., in the illustration in FIG. 3, and which is also accommodated on armature shaft 132.

Cover 120 of housing 116 includes four brush carriers 138. One brush 140, e.g., a carbon brush, is supported in each brush carrier 138 via a spring element 140. Using spring elements 140, brushes 142 are pressed radially inwardly, toward a circular opening 144 in cover 120, thereby contacting commutator rings 136 of electric motors 112 when electric motors 142 are installed.

In addition, cylindrical projections 150 are installed on the top side of cover 120 of housing 116. The diameter of cylindrical projections 150 corresponds to the inner diameter of pole pots 124, thereby ensuring that pole pots 124 may be installed on projections 150. Coupled with the screw attachment of pole pots 124 to cover 120, this further increases the stability of the installation of electric motors 112 on housing 116. Sealing elements (which are not shown in the illustration in FIG. 1) may also be installed on the cylindrical circumferential surfaces of cylindrical projections 150. The sealing elements may be, e.g., one or more shaft-sealing rings and/or O-rings, e.g., rubber rings or Viton rings. They may be accommodated, e.g., in a circumferential groove on the cylindrical circumferential surface of cylindrical projections 150, and/or a shoulder may be provided in the cylindrical circumferential surface, on which sealing elements are accommodated. In this manner, it is ensured that electric motors 112 are sealed when pole pot 124 is installed on cylindrical projection 150.

Housing 116 also includes plug connections 146, which are integrated with cover 120 as a single piece. As an alternative or in addition thereto, other integration techniques known to one skilled in the technical art may be used. For example, only one plug collar of plug connections 146 may be integrally extruded on cover 120, in which case the component is removed from the form before the plug pins are installed. Various injection-molding coating techniques used with parts to be inserted are also feasible. Electric motors 112 and/or engine control unit 114 may be accessed via plug connections 146, to establish a power supply and/or data exchange. For example, as described above, and provided that engine control unit 114 has been installed on a transmission, plug connections 146 may be connected via a CAN bus with the central engine control unit of the motor vehicle.

When integrated drive element 110 is installed, armature shafts 132 of electric motors 112 pass through housing 116. Armature shafts 132 initially pass through openings 144 in the cover, and they then pass through second openings 148 in base plate 118. Ball bearings—as armature shaft bearings 601—are pressed into second openings 148 in base plate 118. In addition, one or more shaft-sealing rings may be installed in second openings 148, to seal housing 116.

The shape of housing 116 is designed to facilitate installation on a transmission housing. It has a basic kidney shape in this exemplary embodiment. Screw-attachment eyelets 152 are installed on base plate 118, which serve as second fastening elements 154 for attaching integrated drive element 110 to a transmission housing.

Figure 2:
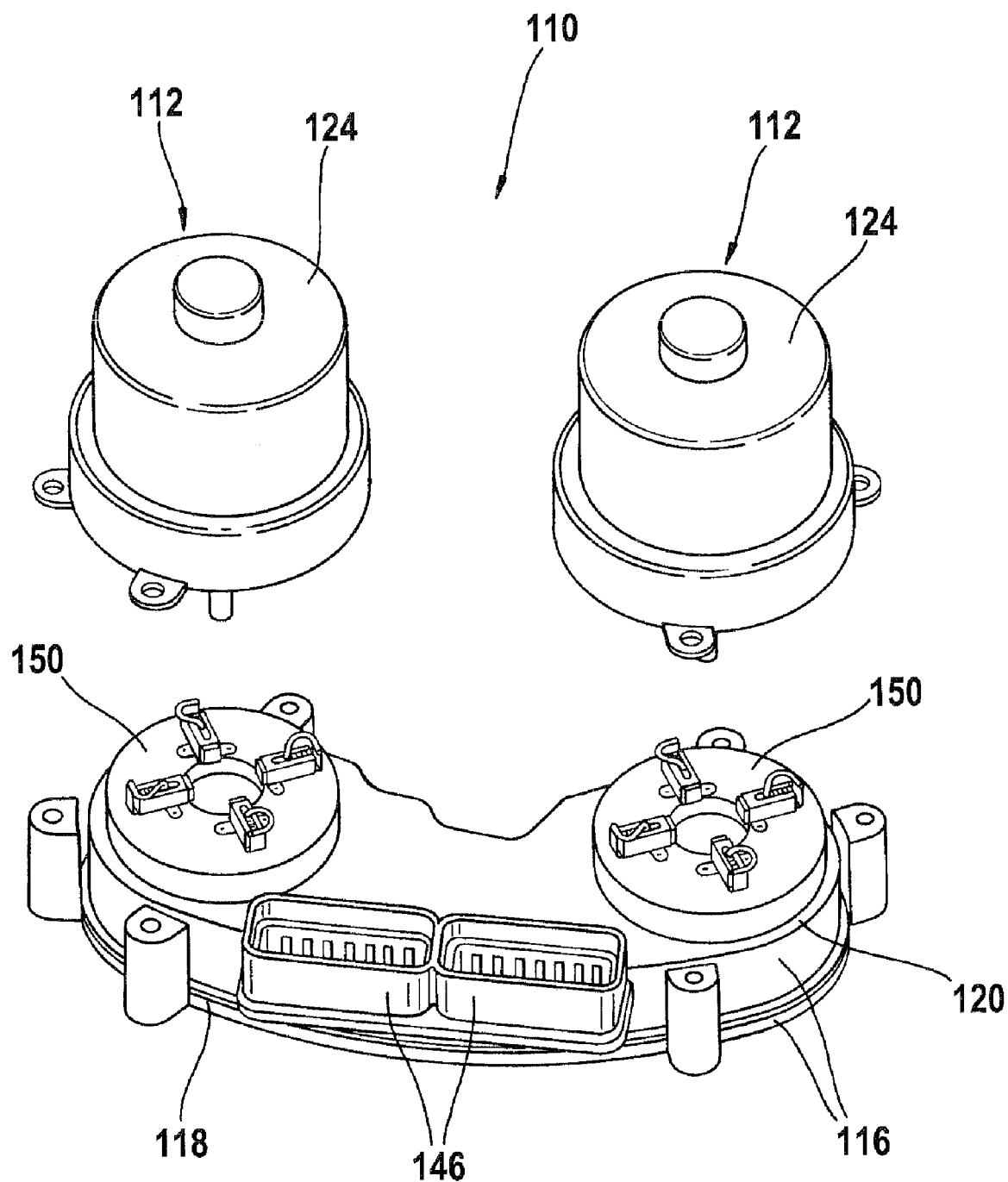
FIG. 2 shows the exemplary embodiment in FIG. 1 after installation of the base plate of the housing, with the cover.

Integrated drive element 110 per FIG. 1 is shown partially assembled in FIG. 2. Cover 120 of housing 116 is placed on base plate 118, thereby sealing housing 116 in which the electronics of engine control unit 114 are accommodated. Contacting may now take place via plug connections 146. Second fastening elements 154 are not shown in FIG. 2.

Figure 3:
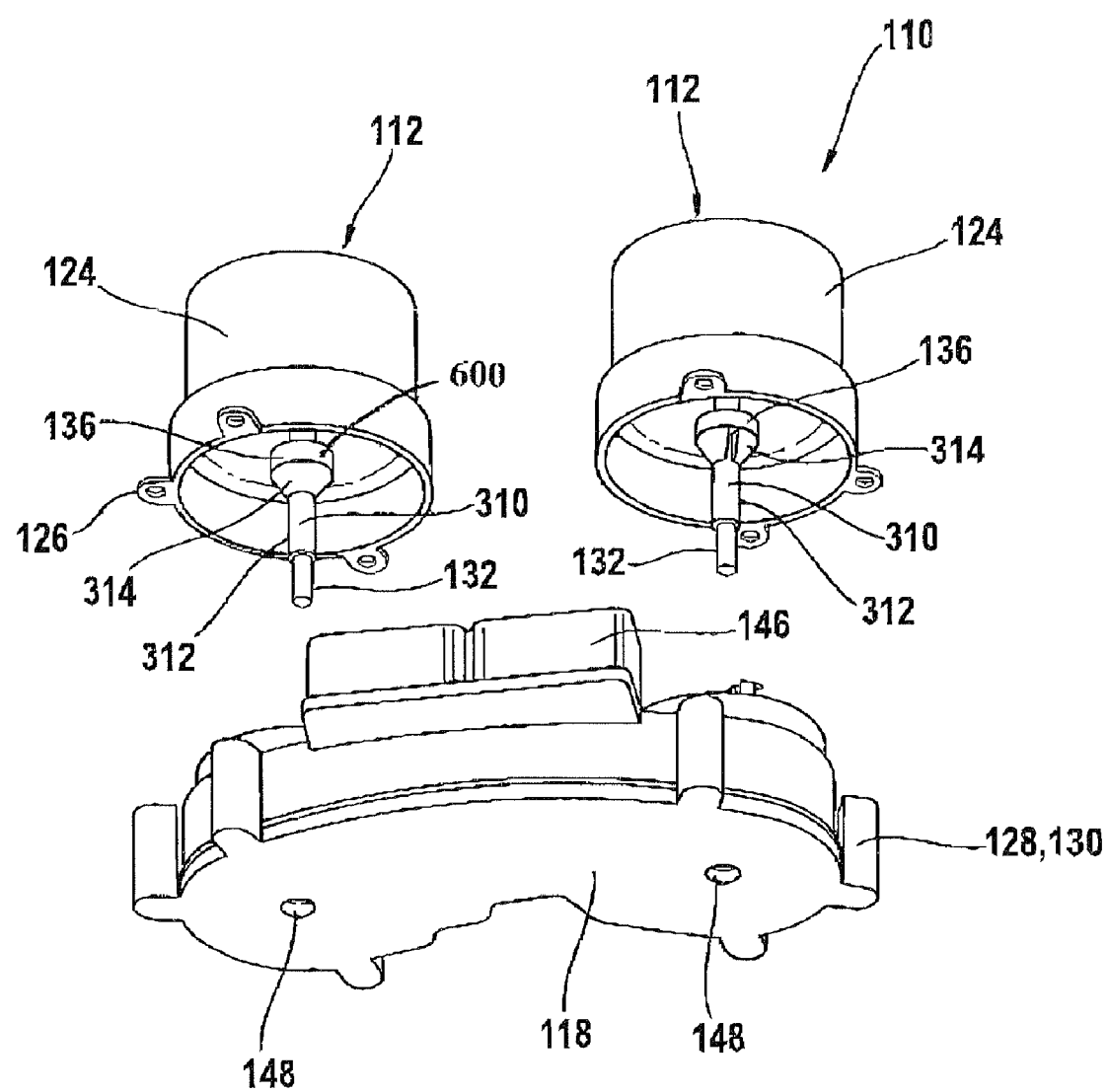
FIG. 3 shows the assembly in FIG. 2, in a view at an angle from below.

FIG. 3 shows the assembly of integrated drive element 110 in FIG. 2, in a view at an angle from below. Reference is hereby made largely to FIGS. 1 and 2 for the description.

A sleeve 310, which has been installed on armature shaft 132, is also shown in FIG. 3. This sleeve is designed as a "lost sleeve" and is slotted, for instance, thereby enabling the sleeve to be clipped onto armature shaft 132. A sensor magnet 600 (e.g., in the form of a single magnet and/or a magnetic pole wheel) may be integrated in sleeve 310, via which, e.g., an angular position of electric motors 112 may be detected using a magnet sensor (e.g., one or more Hall sensors—see sensor printed circuit board 516 in FIG. 5, below)—which is supported in housing 116 and is not shown in FIG. 3—of engine control unit 114.

In the embodiment shown in the figures, sleeve 310 is composed of three components. It includes an initial cylindrical subsection 312, the outer diameter of which is only slightly (by the wall thickness of sleeve 310) thicker than that of armature shaft 132. Initial cylindrical subsection 312 abuts—at the top—a further sub-sleeve with a guide surface 314 designed as a conical surface. This sub-sleeve has a slotted design, thereby allowing it to be clipped onto the other sub-sleeves. Guide surface 314 is abutted at the top by a further sub-sleeve with commutator ring 136, as second cylindrical subsection 316. The at least one sensor magnet is also advantageously integrated in this region of sleeve 310.

With its guide surface 314, sleeve 310 is designed such that, when electric motors 112 are installed, sleeve 310 passes through opening 144 in cover 120. Conical guide surface 314 thereby pushes spring-loaded brushes 142 back against the spring force of spring element 140, so that they further expose opening 144 until brushes 142 come to bear against commutator ring 136. Guide surface 314 therefore enables electric motors 112 to be joined in a "blind" manner with housing 116.

Figure 4:
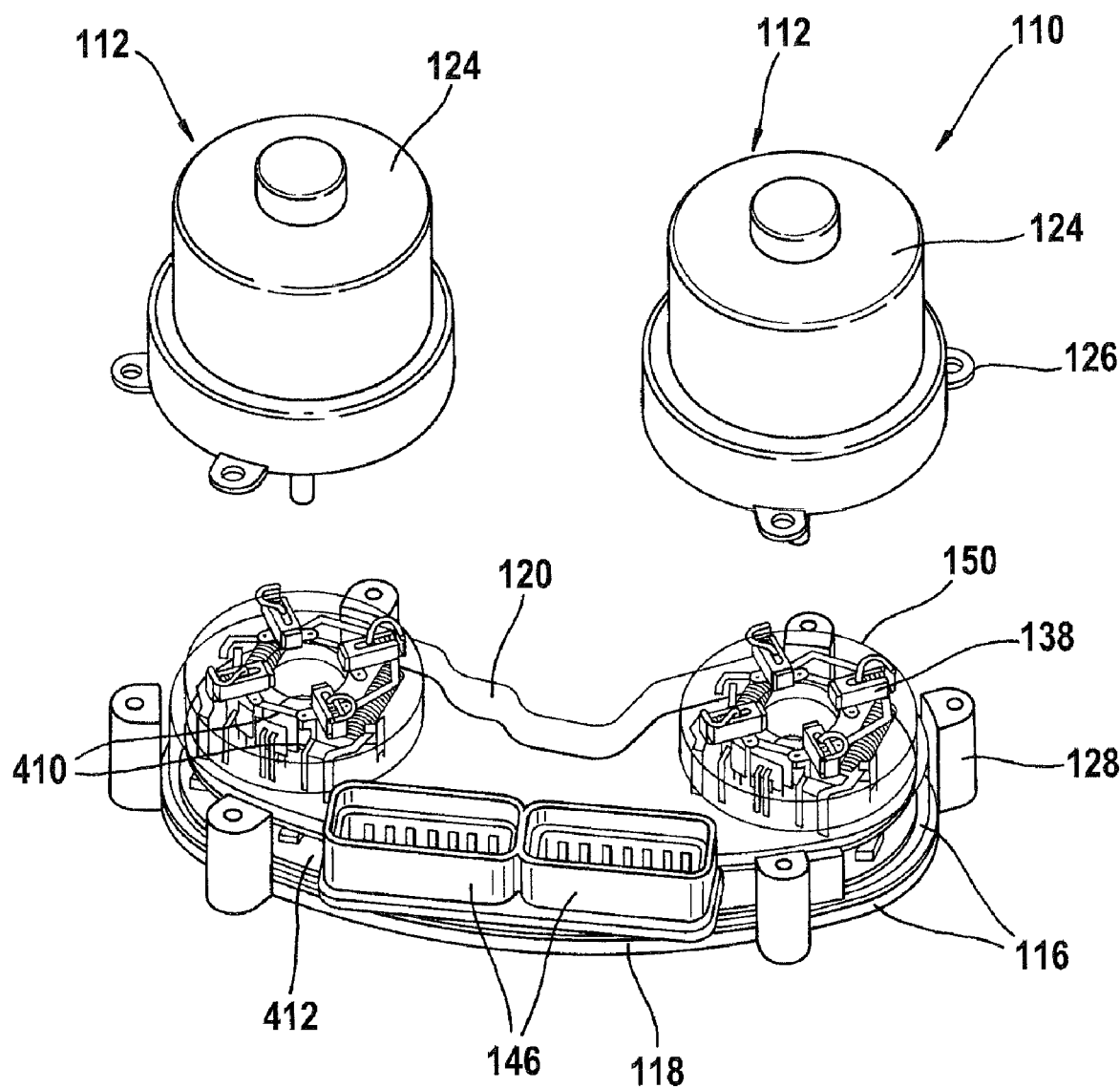
FIG. 4 shows the assembly in FIG. 2, in a depiction with a transparent cover.

FIG. 4 shows integrated drive element 110 per FIG. 2 with transparent cover 120. It is shown clearly that projections 150 of cover 120, on which brush carriers 138 are installed, accommodate a large number of connecting elements 410. Connecting elements 410 serve to apply current to the rotor windings via brushes 142 at the correct time, and to adjust the current intensities as necessary. Connecting elements 410 are contacted electrically using a cutting and clamping technique, and they are connected with an electronics printed circuit board 412. Housing 116 may be designed, e.g., as an injection-molded component, and individual or all of the components—brush carrier 138, connecting elements 410—and cutting-clamping contacts may be integrally extruded into this injection-molded component, either partially or entirely. As an alternative, e.g., an embodiment as a deep-drawn, sheet steel component is possible.

Figure 5:
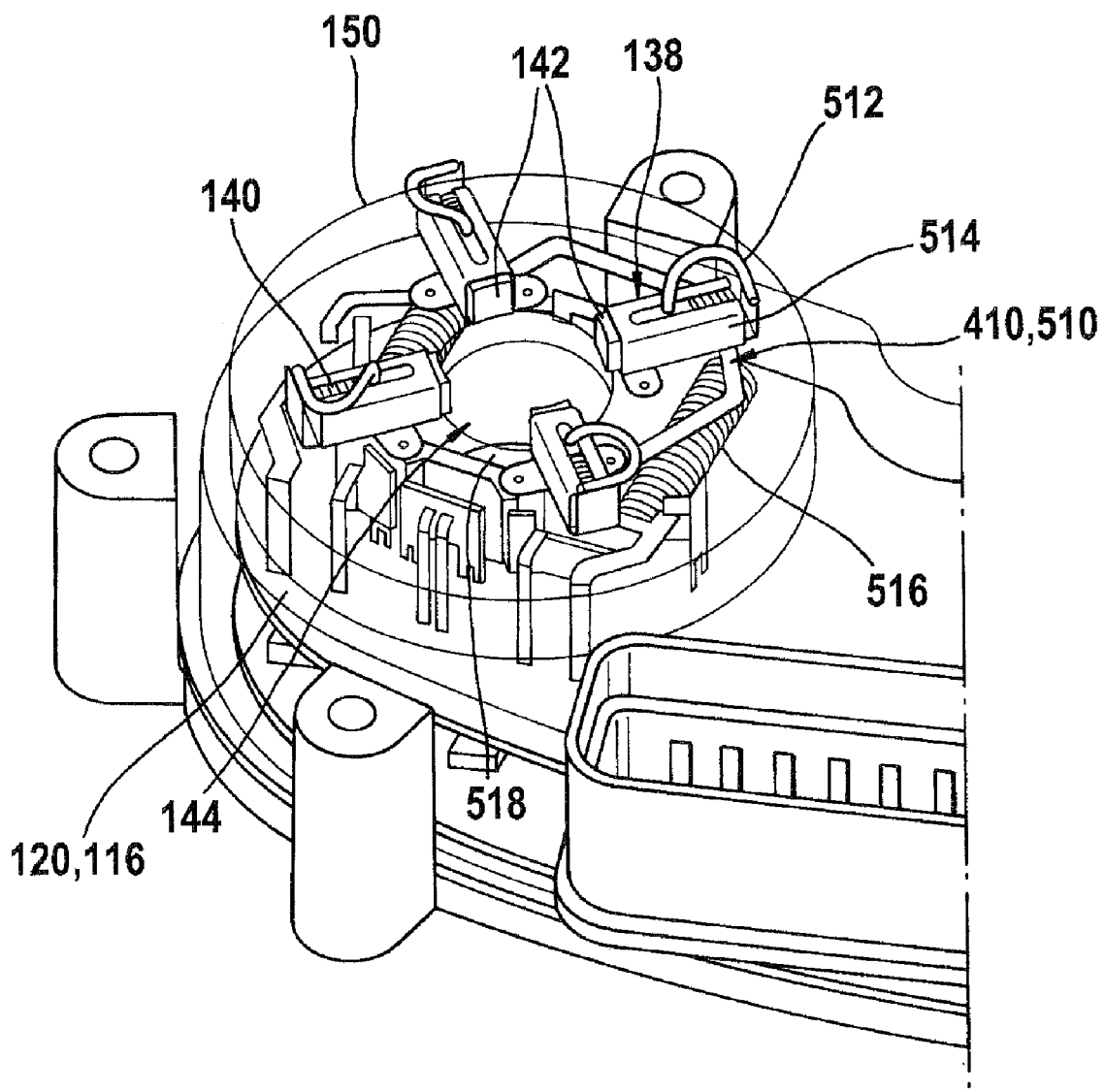
FIG. 5 shows a detailed view of the assembly in FIG. 4.

For clarity, FIG. 5 shows the region of projection 150 shown at the left in FIG. 4, in an enlarged view. It is shown that connecting elements 410 include a punched-bent part 510, which may be, e.g., a copper part. This punched-bent part provides the necessary electrical contacts with brushes 142 using the cutting-clamping technique, with the last contacting toward brushes 142 being formed by wires 512. Punched-bent part 510 may be coated via injection-molding, e.g., as a part to be inserted, when covers 120 are produced.

Brush carriers 138 each include a brush holder 514, which is cuboid in design, and which is welded onto punched-bent part 510 and is partially coated along with it via injection-molding. Brushes 142, which are designed as carbon brushes, are supported in brush holder 514 such that they may slide in the radial direction. Spring elements 140 are also accommodated in brush holders 140. Spring elements 140 are designed as coiled springs and press brushes 142 radially inwardly, into opening 144.

FIG. 5 also shows interference-suppression throttles 516, which are located inside housing 116 and are electrically connected with punched-bent part 510 (e.g., using the cutting-clamping technique). A sensor printed circuit board 518, which is located radially toward opening 144, is accommodated in housing 116. Hall sensors are installed on sensor printed circuit board 518, which serves to sense the angular position of electric motors 112.

The assembly of integrated drive element 110 as depicted in FIGS. 1 through 5 is relatively simple, compared with conventional techniques in which a wiring harness is used. First, armature shaft 132 is inserted into pole pots 124 along with the rotor laminated cores and the rotor windings, and sleeve 310 is placed on rotor shafts 132.

At the same time or in parallel therewith, electronics printed circuit board 412 is installed on base plate 118, and it is fixed in position (e.g., via a screw connection, bonding, or clamping). Finally, cover 120 is placed on base plate 118, thereby closing housing 116.

After this assembly step, electromotors 112 are still separate from engine control unit 114. To install electromotors 112 on engine control unit 114, armature shafts 132 are slid through openings 144 and 148 of housing 116, and pole pots 124 are simultaneously slid onto projections 150 of cover 124. As described above, brushes 142 are pushed back by guide surfaces 314 of sleeves 310 until brushes 142 bear against commutator rings 136. Pole pots 124 are then screwed together with housing 116 via screw-connection eyelets 126 and threaded bores 128. As the screws are tightened, cover 120 is pressed against base plate 118, thereby sealing housing 116.

After this assembly step, integrated drive element 110 is ready to be installed on a transmission housing. This installation may be carried out, e.g., using a screw or rivet connection using screw-attachment eyelets 152 shown in FIG. 1.

What is claimed is:

1. An integrated drive element (110) for use in an automatic transmission, comprising:
    at least one electric motor (112), and at least one electronic engine control unit (114) configured to control the functionality of the at least one electric motor (112), wherein the at least one engine control unit (114) includes a housing (116), and the at least one electric motor (112) abuts the housing (116) directly;
    at least one brush carrier (138) with at least one brush (142) of the at least one electric motor (112), wherein said at least one brush carrier is integrated in the housing (116), wherein the at least one brush (142) is spring-loaded, and is pressed via at least one spring element (140) against at least one commutator ring (136) of the at least one electric motor (112);
    at least one sleeve (310) accommodated on at least one armature shaft (132) of the at least one electric motor (112), wherein said at least one sleeve (310) includes at least one conical guide surface (314), wherein said at least one conical guide surface (314) is configured such that when the at least one electric motor (112) is installed on the at least one housing (116), the at least one brush (142) is guided toward the at least one commutator ring (136).

2. The integrated drive element (110) as recited in claim 1, wherein at least one sensor magnet is integrated in the at least one sleeve (310).

3. The integrated drive element (110) as recited in claim 1, wherein the housing (116) includes at least a first fastening element (130) for attaching at least one pole pot (124) of the at least one electric motor (112).

4. The integrated drive element (110) as recited in claim 1, wherein the housing (116) includes at least a second fastening element (154) for attaching the housing (116).

5. The integrated drive element (110) as recited in claim 1, wherein at least one armature shaft (132) passes through the housing (116).

6. The integrated drive element (110) as recited in claim 5, wherein at least one bearing of the at least one armature shaft is integrated in the housing (116).

7. The integrated drive element (110) as recited in claim 1, wherein at least one plug element (146) is integrated in the housing (116).

* * * * *